United States Patent [19]

Fujimoto et al.

[11] Patent Number: 5,445,739
[45] Date of Patent: Aug. 29, 1995

[54] COMPOSITE MEMBRANE THAT INCLUDES A SEPARATION MEMBRANE

[75] Inventors: Hiroyoshi Fujimoto, Okayama; Mari Sakai, Kagoshima, both of Japan

[73] Assignee: Japan Gore-Tex, Inc., Tokyo, Japan

[21] Appl. No.: 928,571

[22] Filed: Aug. 13, 1992

Related U.S. Application Data

[63] Continuation of Ser. No. 830,100, Feb. 3, 1992, abandoned.

[30] Foreign Application Priority Data

Feb. 4, 1991 [JP] Japan ................................. 3-035702

[51] Int. Cl.$^6$ ............................................. B01D 71/32
[52] U.S. Cl. ................................. 210/490; 210/500.36
[58] Field of Search ............... 210/490, 638, 500.36, 210/500.42; 204/295, 296; 55/16, 158; 427/245, 246

[56] References Cited

U.S. PATENT DOCUMENTS

4,954,388  9/1990  Mallouk et al. ............... 204/295 X
5,041,225  8/1991  Horman ....................... 210/500.36

FOREIGN PATENT DOCUMENTS

0326083  8/1989  European Pat. Off. .
0326360  8/1989  European Pat. Off. .
0456939  11/1991  European Pat. Off. .
9006337  6/1990  WIPO .

OTHER PUBLICATIONS

Journal of Membrane Science, vol. 54, No. ½, 15 Nov. 1990, Amsterdam pp. 51–61; "Thin and Composite High–Flux Membranes of Perfluorosulfonated Ion-Exchange Polymer".

Primary Examiner—Frank Spear
Attorney, Agent, or Firm—Gary A. Samuels

[57] ABSTRACT

A composite membrane is provided in which a functional separation membrane is adhered to a hydrophilic porous fluoropolymer support membrane whose pores are coated with a fluorine-containing copolymer that provides durable hydrophilic properties to the membrane.

8 Claims, No Drawings

COMPOSITE MEMBRANE THAT INCLUDES A SEPARATION MEMBRANE

This application is a continuation, of application Ser. No. 07/830,100 filed Feb. 3, 1992 now abandoned.

FIELD OF THE INVENTION

This invention relates to composite membranes that are hydrophilic; and more particularly to composite membranes comprising fluoropolymer membranes having continuous pores through the membrane in which the inner surfaces of the pores are coated with a hydrophilic fluorine-containing copolymer and a second material, selected for its separation properties, which is adhered to the hydrophilic fluoropolymer membrane.

BACKGROUND OF THE INVENTION

Preparation and use of membranes for separation of solids, liquids, and gases at molecular size levels through ultrafine pores in the membrane or by selective permeability of the membranes for the solids, liquids, and gases, is well known. These membranes are usually very thin and mechanically weak so that to facilitate their handling and use, the practice of combining them with stronger membranes or films for support has been widely adopted.

Among the more desirable materials for use as supports are porous fluoropolymer membranes. Fluoropolymers, and particularly polytetrafluoroethylene (PTFE), are desirable because of their high heat resistance and high chemical resistance. However, these membranes are hydrophobic and cannot be used as supports where hydrophilicity is required. Also, their non-stick properties make permanent attachment to other materials very difficult.

In order to provide such hydrophobic porous fluoropolymer membranes with a capability of permeating water therethrough, it is necessary to make the inner surfaces of the fine pores of the fluoropolymer membranes hydrophilic. Review has been made of various methods for making the inner surfaces of fine pores of porous fluoropolymer membranes hydrophilic. Such methods may include, for example, (1) the method of replacement with water after impregnation of the membrane with a hydrophilic organic solvent such as an alcohol; (2) the method of impregnating the membrane with a surfactant through its alcohol solution; (3) the method of impregnating the membrane with a monomer containing a hydrophilic group and then polymerizing the monomer; (4) the method of making the membrane hydrophilic by impregnation with a hydrophilic polymer such as polyvinyl alcohol through its aqueous solvent solution; (5) the method of impregnating the membrane with a monomer containing a hydrophilic group and then graft-polymerizing the monomer by treatment with strong reducing agents or plasma gases, or by irradiation with high energy radiation such as gamma rays, electron beam, etc.

These conventional methods, however, have various drawbacks. Method (1) has the problem that the effect is lost once the materials have been dried. Method (2) has the drawback that the surfactant may likely elute thereby worsening durability. Methods (3) and (4) may cause clogging of the fine pores of the membrane and may cause low durability as the polymer may be likely to elute. Consequently, cross-linking of the impregnated polymer are sometimes carried out for the purpose of preventing elution of the polymer in the methods (2), (3) and (4). These treatments are described in examined Japanese Patent Publication Nos. 21270/1978, 8669/1979, 154737/1981 and 98640/1989. Method (5) may deteriorate the mechanical properties of the materials and furthermore it may be difficult to prevent homopolymerization of the monomer and the elution of the homopolymer.

SUMMARY OF THE INVENTION

The present invention overcomes the deficiencies of the above-described products and procedures. The present invention provides a composite membrane comprising a porous hydrophilic fluoropolymer support membrane in combination with a second material having selected special properties.

The porous hydrophilic fluoropolymer support membrane of the composite membrane of the invention is a porous fluoropolymer membrane in which the inner surface of at least a portion of the pores are coated with a hydrophilic fluorine-containing copolymer that provides durable hydrophilic properties to the membrane. The membrane can be treated with the copolymer by impregnation without any special treatment. The second material, selected for special properties, such as ultrafiltration, reverse osmosis, selective permeability of liquids and gases, ion exchange and the like, is combined with the hydrophilic porous fluoropolymer membrane, for example, by adhering the second material to the surface of the hydrophilic porous fluoropolymer membrane or by impregnation of the hydrophilic porous fluoropolymer with the second material thus forming a hydrophilic composite membrane suitable for use in aqueous systems.

The hydrophilic porous fluoropolymer support membrane of the composite membrane of the invention is spontaneously wetted by water and other aqueous liquids, thus providing, without use of substitutional fugitive liquids, surfactants, or other special treatments, quick and complete filling of aqueous liquids into the support membrane interior and intimate contact by the liquids with the internal surface of the separation membrane.

Specifically, the composite membrane of the invention comprises a separation membrane adhered to a hydrophilic porous fluoropolymer support membrane having continuous pores through the membrane, in which at least a portion of the interior of the support membrane is coated with a hydrophilic fluorine-containing copolymer comprising (i) units of a fluorine-containing monomer and (ii) units of a non-fluorinated vinyl monomer containing a hydrophilic functional group; wherein the amount of the copolymer is sufficient to impart increased hydrophilicity to the fluoropolymer membrane.

Preferably, the fluorine content of the hydrophilic fluorine-containing copolymer is between 2 and 60 percent by weight of the copolymer.

Preferably, also, the ratio of the formula weight of the recurring units of the copolymers to the number of functional group units in the formula is between 45 and 700.

DESCRIPTION OF THE INVENTION

With respect to the hydrophilic porous fluoropolymer support membrane of the present invention, as long as continuous pores are present in the porous fluoropolymer membrane to be used as a substrate, the method for forming such pores is not restricted to a particular method. For example, stretching, expanding, bubbling, extraction, or the like may be used.

The kind of fluorine resin used to make the fluoropolymer membrane is not restricted and a variety of fluorine resins may be used. While the fluorine resin preferably used as the membrane for the present invention is polytetrafluoroethylene; in addition, tetrafluoroethylene/hexafluoropropylene copolymer, polyvinylfluoride, polyvinylidene fluoride, and the like, may also be used. Porous polytetrafluoroethylene is preferred, especially a porous expanded polytetrafluoroethylene.

The porous fluoropolymer membrane preferably used in the composite membrane of the present invention is expanded polytetrafluoroethylene having a porosity ranging usually from 15% to 95%, preferably from 50% to 95% and a pore diameter ranging usually from 0.02 to 30 microns, preferably from 0.02 to 10 microns. This material is described in examined Japanese Patent Publication Nos. 45,773/1981 and 17,216/1981, and in U.S. Pat. No. 4,187,390.

The hydrophilic fluorine-containing copolymer used to coat the inner surfaces of the fine pores of the porous fluoropolymer membrane may be a copolymer of a fluorine-containing ethylenically unsaturated monomer and a non-fluorinated vinyl monomer containing a hydrophilic group. It may be made by copolymerizing the monomers.

Preferably the fluorine-containing monomer of the fluorine-containing copolymer will be a vinyl monomer such as, for example, tetrafluoroethylene, vinyl fluoride, vinylidene fluoride, monochloro-trifluoroethylene, dichlorodifluoroethylene, hexafluoropropylene, and the like. More preferably, the fluorine-containing vinyl monomer can be described as

CXY=CFZ wherein Z can be fluorine or hydrogen and X and Y can each be selected from hydrogen, fluorine, chlorine and —CF3.

Other fluorine-containing monomers useful herein that are not vinyl monomers include hexafluoroacetone,

The vinyl monomer containing a hydrophilic functional group may be a vinyl monomer having a hydroxyl group, carboxyl group, sulfonic group, amide, —COONH2 or amine. For example, the monomer may be acrylic acid, methacrylic acid, sulfonated styrene, vinyl alcohol, and the like.

The copolymer of vinyl alcohol with the fluorine-containing monomer may be prepared by saponifying a copolymer of vinyl acetate with the fluorine-containing monomer to thereby convert the acetate group contained in the copolymer into the hydroxyl group. In this case, not all of the acetate groups contained in the copolymer are necessarily replaced by the hydroxyl group and the conversion of the acetate groups into the hydroxyl groups may be carried out to the extent needed to provide the copolymer with hydrophilic properties.

The fluorine content of the fluorine-containing hydrophilic copolymer to be used in the present invention may range usually from 2% to 60%, preferably from 10% to 60%, and most preferably 20%–60% on a weight basis. If the fluorine content of the fluorine-containing hydrophilic copolymer becomes too high, on the one hand, the hydrophilic properties of the polymer may be lessened, though the heat resistance becomes better. If the fluorine content becomes too low, on the other hand, adhesion of the fluorine-containing hydrophilic polymer to the porous fluoropolymer membrane may be reduced and the heat resistance may be decreased.

The equivalent weight is the formula weight divided by the number of functional units in the formula and will be generally between 45 and 700, preferably, 60–500 and most preferably, 60–450.

If the equivalent weight is lower than 45, the water solubility of the fluorine-containing hydrophilic copolymer may be too high and the fluorine-containing copolymer will elute away with water; and if the equivalent weight is higher than 700, the hydrophilic properties will be lessened, but the interaction between the copolymer and the porous membrane will be increased and thus the copolymer will not tend to elute away.

The following Table provides the mole % fluorine monomer units in the copolymer, the fluorine weight % (F-wt %) and the equivalent weight (EqW) for a number of copolymers (where VOH is vinyl alcohol):

| Copolymer | Molar Ratio in Copolymer | Mole % of F-monomer Units in copolymer | F-wt % | Eq-W |
|---|---|---|---|---|
| $(CF_2=CF_2)_x/(VOH)_y$ | x = 1, y = 40 | 2.4 | 4.2 | 45.5 |
| | 1, 30 | 3.2 | 5.5 | 46.4 |
| | 1, 20 | 4.8 | 7.9 | 48.0 |
| | 1, 10 | 9.1 | 14.3 | 53 |
| | 1, 4 | 20 | 27.5 | 68 |
| | 1, 1 | 50 | 53.1 | 143 |
| | 10, 1 | 91 | 72.8 | 1043 |
| $(CF_2=CH_2)_x/(VOH)_y$ | x = 1, y = 40 | 2.4 | 2.1 | 44.6 |
| | 1, 30 | 3.2 | 2.8 | 45.2 |
| | 1, 20 | 4.8 | 4.1 | 46.2 |
| | 1, 10 | 9.1 | 7.5 | 49 |
| | 1, 4 | 20 | — | — |
| | 1, 1 | 50 | 33.6 | 107 |
| | 10, 1 | 91 | 55.6 | 683 |
| $(CFH=CH_2)_x/(VOH)_y$ | x = 1, y = 40 | 2.4 | 1.1 | 44.2 |
| | 1, 30 | 3.2 | 1.4 | 44.6 |
| | 1, 20 | 4.8 | 2.1 | 45.3 |
| | 1, 10 | 9.1 | 4.0 | 47.6 |

-continued

| Copolymer | Molar Ratio in Copolymer | | Mole % of F-monomer Units in copolymer | F-wt % | Eq-W |
|---|---|---|---|---|---|
| | 1, | 4 | 20 | — | — |
| | 1, | 1 | 50 | 21.3 | 89 |
| | 10, | 1 | 91 | 37.8 | 503 |
| $(CF_2=CFCl)_x/(VOH)_y$ | x = 1, y = | 40 | 2.4 | 3.1 | 46.0 |
| | 1, | 30 | 3.2 | 4.0 | 46.9 |
| | 1, | 20 | 4.8 | 5.8 | 48.9 |
| | 1, | 10 | 9.1 | 10.4 | 54.6 |
| | 1, | 4 | 20 | — | — |
| | 1, | 1 | 50 | 35.8 | 159 |
| | 10, | 1 | 91 | 47.2 | 1208 |
| $(CF_2=CCl_2)_x/(VOH)_y$ | x = 1, y = | 40 | 2.4 | 2.0 | 46.5 |
| | 1, | 30 | 3.2 | 2.7 | 47.7 |
| | 1, | 20 | 4.8 | 3.8 | 50.0 |
| | 1, | 10 | 9.1 | 6.7 | 57 |
| | 1, | 4 | 20 | — | — |
| | 1, | 1 | 50 | 20.8 | 183 |
| | 10, | 1 | 91 | 26.3 | 1442 |
| $(CF_2=CFCF_3)_x/(VOH)_y$ | x = 1, y = | 40 | 2.4 | 6.1 | 46.8 |
| | 1, | 30 | 3.2 | 7.9 | 48.0 |
| | 1, | 20 | 4.8 | 11.3 | 50.5 |
| | 1, | 10 | 9.1 | 19.6 | 58 |
| | 1, | 4 | 20 | — | — |
| | 1, | 1 | 50 | 59.0 | 193 |
| | 10, | 1 | 91 | 73.9 | 1543 |
| $((CF_3)_2C=O)_x/(VOH)_y$ | x = 1, y = | 10 | 9.1 | 19.1 | 60 |
| | 1, | 1 | 50 | 51.6 | 221 |
| | 10, | 1 | 91 | 62.5 | 1823 |
| $(CF_2-CF_2)_x/(VOH)_yCF_2$ | x = 1, y = | 10 | 9.1 | 19.6 | 58 |
| | 1, | 1 | 50 | 59.0 | 193 |
| | 10, | 1 | 91 | 73.9 | 1543 |
| $(CF_2-CF_2)_x/(VOH)_yO$ | x = 1, y = | 10 | 9.1 | 13.9 | 55 |
| | 1, | 1 | 50 | 47.8 | 159 |
| | 10, | 1 | 91 | 63.2 | 1203 |
| $(CF_2=O)_x/(VOH)_y$ | x = 1, y = | 10 | 9.1 | 7.7 | 50 |
| | 1, | 1 | 50 | 34.8 | 109 |
| | 10, | 1 | 91 | 54.0 | 703 |
| $(CF_2=S)_x/(VOH)_y$ | x = 1, y = | 10 | 9.1 | 7.4 | 52 |
| | 1, | 1 | 50 | 30.3 | 125 |
| | 10, | 1 | 91 | 44.0 | 864 |
| $(CClF=S)_x/(VOH)_y$ | x = 1, y = | 10 | 9.1 | 3.6 | 53 |
| | 1, | 1 | 50 | 13.4 | 142 |
| | 10, | 1 | 91 | 18.5 | 1028 |

The porous fluoropolymer membrane coated with the hydrophilic fluorine-containing copolymer may be prepared, for example, by dissolving the hydrophilic fluorine-containing copolymer in an organic solvent such as, for example, an alcohol, ketone, ester, amide or hydrocarbon, and immersing the porous fluoropolymer membrane in the resulting solution; or impregnating the membrane with the resulting solution by spraying the membrane with the resulting solution; or by coating the former with the latter by means of rolls, and drying the resulting product. It is believed this procedure may allow the hydrophilic fluorine-containing copolymer to adhere to the internal surface of the membrane, thereby enabling water to permeate through the fine pores. Although the amount of the fluorine-containing hydrophilic polymer to adhere to the substrate may vary with the porosity of the porous fluorine resin used, and so on, the amount may be in the range usually from 1.5% to 10% by weight, preferably from 2% to 6% by weight, with respect to the weight of the resulting final product.

The hydrophilic porous fluoropolymer support membrane of the present invention may also be prepared by impregnating the porous fluoropolymer membrane with a solution of a copolymer in an organic solvent, such a copolymer being comprised of the fluorine-containing monomer with a monomer having a hydrophobic group convertible into a hydrophilic group, such as vinyl acetate, drying the substrate and converting at least a portion of the hydrophobic groups into the hydrophilic groups.

The porous fluoropolymer support materials according to the present invention may be in any shape such as film, sheeting, tubing, yarn, fabric, etc. and may themselves be additionally strengthened by lamination to conventional reinforcing materials such as porous woven and non-woven fabrics, webs, netting, mesh and the like of synthetic polymers.

The hydrophilic porous fluoropolymer support membrane of the present invention has a structure in which the hydrophilic fluorine-containing copolymer adheres to the internal structure of the membrane that forms the pores of the membrane. The pores are thereby rendered hydrophilic so that water will readily enter and permeate through the pores. Appropriate equivalent weight of copolymer, which relates to solubility of the copolymer to water, may prevent the elution of the copolymer itself from the porous material. In addition, the force by which the hydrophilic fluorine-containing copolymer is attached to and adheres to the fluoropolymer membrane is strong due to the interaction of the fluorine atoms of the hydrophilic copolymer with those of the membrane and the durability of the copolymer can be maintained over a long period of time in a stable fashion. Hence, after impregnation of the porous fluoropolymer membrane with the hydrophilic fluorine-containing copolymer, the copolymer does not require any further laborious treatment, such as cross-linking, as some conventional methods do.

The hydrophilic porous fluoropolymer support membrane described above is combined with a separation membrane, selected on the basis of specific desired separation functions such as ultrafiltration, reverse osmosis, ion exchange, and the like, to form the composite membrane of the invention. Many suitable materials for separation membranes are known in the art including, but not limited to, the class consisting of polyacrylonitrile, cellulose acetate, polyimide, polysulfone, polyethersulfone, polyphenylsulfone, polyamide, polyaramide, and polyvinyl. Preferably the material of the separation membrane will include fluorine-containing groups.

The separation membrane may be applied and adhered to the hydrophilic porous fluoropolymer support membrane by methods known in the art. For example, it may be applied to the surface of the support membrane as a solid film. Alternatively, the materials of the separation membrane may be dissolved in a solvent and, in liquid or gel form, coated onto the surface of the support membrane or, partially or completely, impregnated into the support membrane; after which the solvent is removed by conventional drying methods, leaving the separation membrane in place.

The composite membrane of the invention may also be used in a form in which the separation membrane is sandwiched between two layers of hydrophilic porous fluoropolymer support materials using the methods describe above.

TEST PROCEDURES

Thickness

Thickness was measured with a dial thickness gauge having an accuracy of 1/1000 of a millimeter.

Porosity

Pre-impregnation porosity is found by measuring the density of the sample. Full density of PTFE is 2.2 g/cm$^3$. The porosity is found by using the equation:

$$\text{Porosity} = \frac{2.2 - \text{density of sample}}{2.2} \times 100$$

On calculating the post-impregnation porosity the full density (2.1) of an impregnated membrane was used instead of 2.2.

Ethanol Bubble Point (EBP)

EBP was determined by spreading ethanol on the surface of the membrane specimen and placing the specimen horizontally in a clamp device. Air was blown from underneath. The EBP is the initial pressure in kg/cm$^2$ at which air bubbles appear continuously from the opposite surface.

Gurley Number (GN)

GN is determined by measuring the time required for 100 cm$^3$ air to flow through 6.45 cm$^2$ sample area under the pressure of 12.4 cm H2O.

Fluorine and Hydroxyl Group Content

Fluorine content and hydroxyl group content of the copolymer were determined by calculation from the result by the elemental analysis of the copolymer.

Hydrophilicity

Initial hydrophilicity was determined by dropping a drop of water on the surface of a sheet of sample from a height of 5 cm and measuring the time it takes for the drop to be absorbed.

Degree of hydrophilicity is as follows:
A = absorbed within 1 second
B = is eventually absorbed
C = is absorbed only by applying pressure
D = is not absorbed, but contact angle becomes smaller
E . is not absorbed, i.e., it repels water. "E" is typical of porous expanded PTFE.

Flow Time

Flow time is the time required to pull 200 cc of water at 1 atmospheric vacuum through a 35 mm diameter sample. The sample was placed in a fixed horizontal position and the vacuum was pulled. Then water was poured on top. For pre-impregnation measurements the membrane was first impregnated with ethanol to make the membrane compatible with water.

Water Permeability

WP was determined by the equation $$WP = \frac{200}{\text{Flow Time in minutes}} \times 1.75^2 \times 3.14$$

Durability

Durability of the impregnated membrane is expressed by the Hydrophilicity test after subjecting a sample to the Flow Time procedure five times with drying after each time, or after penetration with 10 liters of water using Flow Time equipment and procedure.

Heat Resistance

Heat resistance was measured by fixing the membrane on a tenter frame and then placing the material in an air oven controlled at a test temperature for the time periods specified, followed by measuring for hydrophilicity as described above.

Resistance to Acids, Bases and Solvents

Samples were immersed in the liquid for the time and at the temperature stated in the examples. The samples were washed with water and then dried and the hydrophilicity observed.

Current Efficiency Test

In de-ionized water 80g of NaCl are dissolved to obtain 500 ml of solution. Two platinum electrodes, 32 mm in diameter and spaced 1.0 mm apart, are located in the electrolyte solution. The direct-current resistance between the electrodes, with and without a test membrane between them, is measured. The difference in the measured resistance is reported in milliohms.

Tensile Test

Tensile strength is measured according to the procedures listed in JIS K6781. Results are reported in Kg/Cm$^2$.

EXAMPLES

Example 1

A hydrophilic porous fluoropolymer support membrane was prepared as follows:

A solution was prepared by dissolving a tetrafluoroethylene/vinyl alcohol copolymer (a saponified compound of a tetrafluoroethylene/vinyl acetate copolymer; saponification degree 100%; fluorine content, 27% by weight; hydroxyl group content, 14.5 mmol/gram) in 1 liter of methanol to result in a 0.2% by weight methanol solution. A porous fluoropolymer membrane of porous expanded polytetrafluoroethylene having a thickness of 30 microns and a porosity of 80% and an EBP of 1.2 kg/cm$^2$ was impregnated with the solution by dipping the membrane into the solution, followed by fixing the membrane on a tenter frame, followed by drying at 50° C. for 5 minutes. This operation was repeated five times, thereby producing the resulting hydrophilic porous fluoropolymer support membrane. It had a good hydrophilicity value of A and a flow time of 60 sec. (Its thickness was 30 microns; porosity, 70%; EBP, 1.2 kg/cm$^2$; pore size, 0.2 microns; WP, 20 cm$^3$/cm$^2$ min. At a heat-resistant temperature of 120° C., original good hydrophilicity remained after 24 hr.; but at 135° C., it was lost.

When the hydrophilic porous fluoropolymer support membrane was immersed in water, no dissolved substances were caused to be produced in the water (i.e., no elution of copolymer), and no changes were indicated when it was immersed in boiling water. It was found that the membrane was highly resistant to acids, such as 12N-HCl at room temperature, IN-HCL at 80° C.; and alkalis such as 5N-NaOH at room temperature, and 1N-NaOH at 80° C.

After testing the hydrophilic porous fluoropolymer support membrane described above was combined with a separation membrane as follows:

The hydrophilic porous fluoropolymer support membrane was immersed in a 1% methanol solution, taken out and fixed on a tenter frame and dried at room temperature for one hour.

A 10 micromillimeter thick perfluoro-based ion exchange film was coated on one surface with a solution of methanol containing 10% perfluoro-based ion exchange resin. The ion exchange film was placed on the support membrane, with the coated surface of the ion exchange film contacting the membrane support surface, and dried at 60° C. for 30 minutes. The chemical formula of both the ion exchange film and resin was

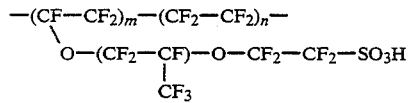

The composite membrane thus obtained was tested for current efficiency and tensile strength. A control sample of perfluoro-based ion exchange film, 100 micrometers thick and having the same chemical formula as the ion exchange film of the composite membrane, was also tested. Test results are tabulated below:

|  | DC Resistance (milliohms) | Tensile Strength (Kg/Cm$^2$) |
| --- | --- | --- |
| Composite Membrane | 120 | 125.0 |
| Control Ion Exchange Film | 273 | 10.2 |

Example 2

A hydrophilic porous reinforced fluoropolymer support membrane was prepared as follows:

A solution was prepared by dissolving a tetrafluoroethylene/vinyl alcohol copolymer (a saponified compound of a tetrafluoroethylene/vinyl acetate copolymer; saponification degree 100%; fluorine content, 27% by weight; hydroxyl group content, 14.5 mmol/gram) in 1 liter of methanol to result in a 0.2% by weight methanol solution. A porous membrane of expanded polytetrafluoroethylene as described in Example 1, and reinforced by lamination to a non-woven polypropylene cloth was impregnated with the solution by dipping the laminate into the solution, followed by fixing the laminate on a tenter frame, followed by drying at 50° C. for 5 minutes. This operation was repeated five times, thereby producing the resulting hydrophilic porous reinforced fluoropolymer support membrane.

The hydrophilic porous fluoropolymer support membrane described above was combined with a separation membrane as follows:

The hydrophilic porous reinforced fluoropolymer support membrane was immersed in a 1% methanol solution, taken out and fixed on a tenter frame and dried at room temperature for one hour.

A 10 micromillimeter thick perfluoro-based ion exchange film was coated on one surface with a solution of methanol containing 10% perfluoro-based ion exchange resin. The ion exchange film was placed on the support membrane, with the coated surface of the ion exchange film contacting the expanded polytetrafluoroethylene membrane support surface, and dried at 60° C. for 30 minutes. The chemical formula of both the ion exchange film and resin was

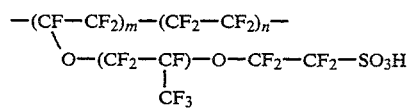

The composite membrane thus obtained was tested for current efficiency and tensile strength. A control sample of perfluoro-based ion exchange film, 100 micrometers thick and having the same chemical formula as the ion exchange film of the composite membrane, was also tested. Test results are tabulated below:

|  | DC Resistance (milliohms) | Tensile Strength (Kg/Cm$^2$) |
| --- | --- | --- |
| Composite Membrane | 133 | 59.7 |
| Control Ion Exchange Film | 273 | 10.2 |

We claim:

1. A composite membrane comprising:
   (a) a separation membrane adhered to
   (b) a hydrophilic porous fluoropolymer support membrane;
   said porous fluoropolymer support membrane having continuous pores through the membrane, in which at least a portion of the interior of the membrane is coated with a hydrophilic fluorine-containing copolymer comprising (i) units of a fluorine-containing monomer and (ii) units of a non-fluorinated vinyl monomer containing a hydrophilic functional group; wherein the amount of the copolymer present is sufficient to impart hydrophilicity to the fluoropolymer support membrane.

2. The composite membrane of claim 1 wherein the separation membrane (a) is selected from the group consisting of polyacrylonitrile, cellulose acetate, polyimide, polysulfone, polyethersulfone, polyphenylsulfone, polyamide, polyaramide, and polyvinylalcohol.

3. The composite membrane of claim 1 wherein the separation membrane (a) is an ion exchange polymer membrane.

4. The composite membrane of claim 1 wherein the separation membrane (a) is a perfluoro-based ion exchange polymer membrane having a sulfonic acid group or a carboxylic acid group.

5. The composite membrane of claims 1, 2, 3 or 4 wherein the hydrophilic porous fluoropolymer support membrane is expanded polytetrafluoroethylene.

6. The composite membrane of claim 5 wherein the fluorine content of the hydrophilic fluorine-containing copolymer is between 2 and 60 percent by weight of the copolymer, and wherein the ratio of the formula weight of the recurring units in the formula is between 45 and 70.

7. The composite membrane of claim 6 wherein the units of the vinyl monomer are selected from the group consisting of vinylidene fluoride, vinyl fluoride, monochlorotrifluoroethylene, dichlorodifluoroethylene, hexafluoropropene and tetrafluoroethylene, and wherein in the hydrophilic fluorine-containing copolymer the functional group of the units of vinyl monomer containing a hydrophilic functional group are selected from the group consisting of hydroxyl group, carboxyl group, sulfonic group, amide, COOHN2, and amine.

8. The composite membrane of claim 7 wherein in the hydrophilic fluorine-containing copolymer, the units of fluorine-containing monomer are tetrafluoroethylene units and the units of vinyl monomer containing a hydrophilic group are units of vinyl alcohol.

* * * * *